United States Patent Office 3,291,129
Patented Dec. 13, 1966

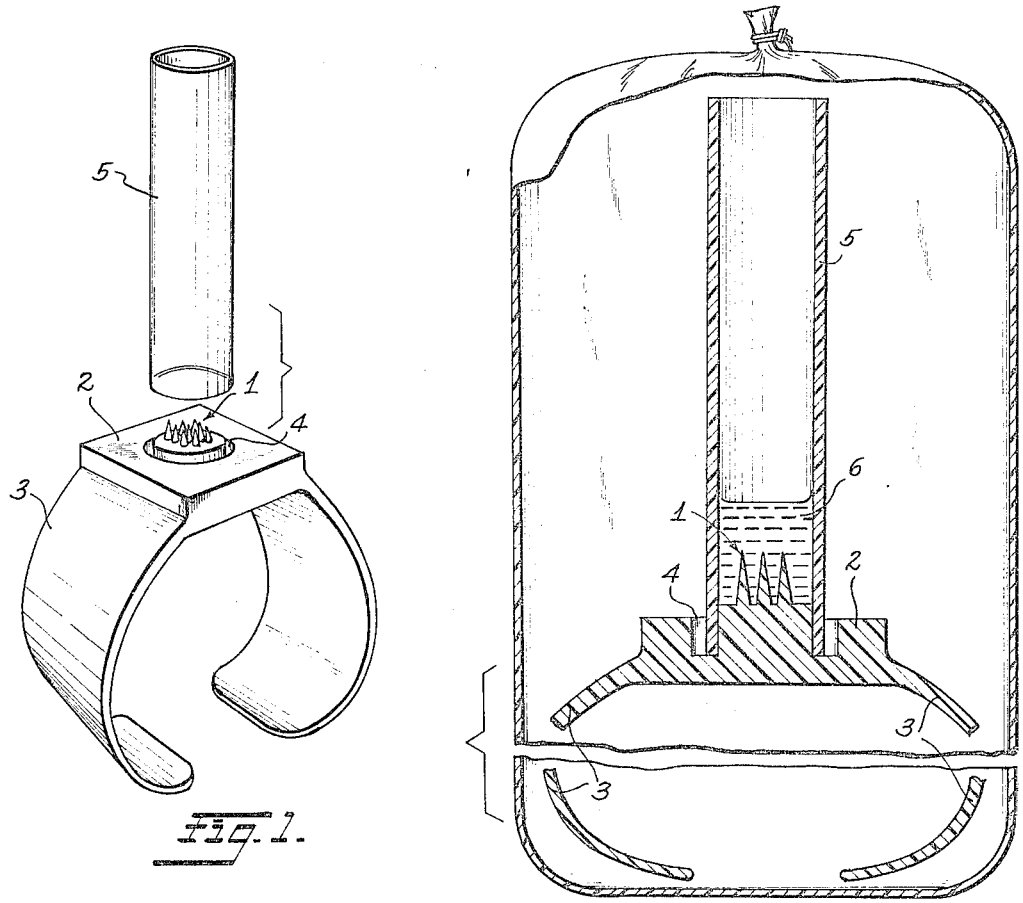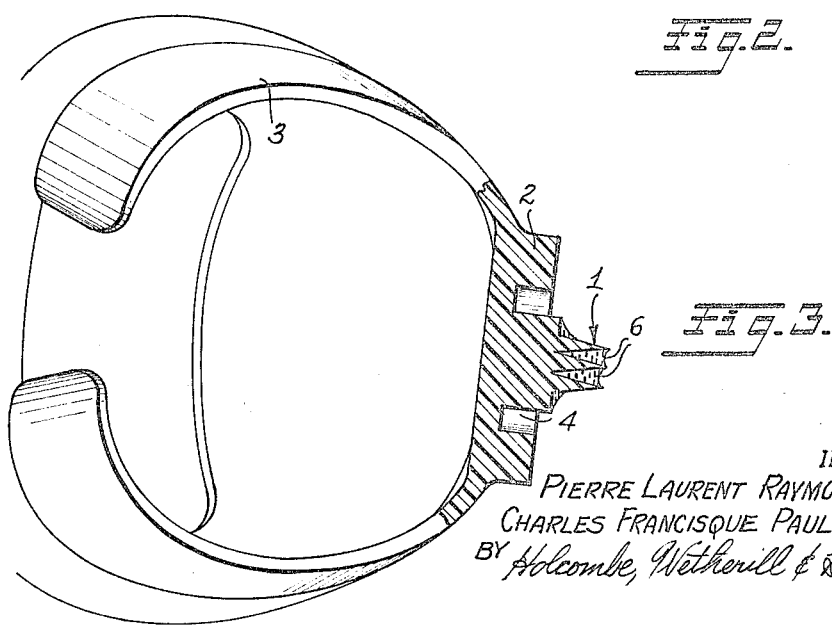

3,291,129
SCARIFICATOR FOR USE IN VACCINATION, SKIN TESTS, OR THE LIKE
Pierre Laurent Raymond Burelle, 93 Avenue Lacassagne, and Charles Francisque Paul Merieux, 14 Avenue Grande-Bretagne, both of Lyon, France
Filed Aug. 8, 1963, Ser. No. 300,777
Claims priority, application France, Aug. 10, 1962, 906,711, Patent 1,349,909
3 Claims. (Cl. 128—253)

This invention relates to improvements in scarificators, which are sharply pointed devices for scratching the skin in order to introduce a medicinal substance into the body so as to carry out various tests or vaccinate the subject.

Those scarificators presently on the market are used by placing the active substance on the points or on the skin just before the scarification, while keeping the scarificator protected against sources of infection and humidity.

These devices are not entirely satisfactory, since on the one hand it is preferable to avoid the necessity of placing the preparation on the points before scarification, and on the other hand lyophilization tests on the active substance on the points have shown that it accumulates at the base of the scarificator and in a substantial number of cases is not introduced into the body.

The present invention relates to an improved scarificator which permits the active substance to be kept on the points, as a more or less viscous liquid, in a particularly simple and effective manner. The substance may be kept in individual doses, or in quantities sufficient to treat a number of people.

It is the object of the present invention to provide a new article of manufacture which comprises a scarificator essentially characterized by the fact that the scarifying points are surrounded by a circular groove. In this groove is a tube having a length which is preferably several times greater than its diameter so that capillarity keeps the active substance within the tube near the scarifying points and at the moment of use, separation of the tube from the scarificator suffices to cause the active substance to perfectly impregnate the scarifying points.

In accordance with the invention it is possible to keep the scarificator impregnated with the active substance for a reasonable length of time by enclosing it in a flexible plastic bag.

In order that the invention may be more clearly understood, one embodiment thereof will now be described, purely by way of illustration and example, with reference to the accompanying drawings, in which:

FIG. 1 is a perspective view showing a scarificator according to the invention, with the tube separated from the scarificator itself;

FIG. 2 is a sectional view through the scarificator enclosed in a plastic bag, as it appears during storage; and FIG. 3 is a sectional view through the scarificator just before it is to be used.

It will be seen from the drawings that the group of scarifying points 1 is mounted on a base 2, carried, in the embodiment illustrated by a ring 3.

It will, however, be understood that the scarifying device may be of any type and that the support 2 may, for example, be mounted on a thimble, or even provided with means permitting it to be gripped between the thumb and the index finger.

The drawing also shows the circular groove 4 which surrounds the scarifying points, together with the tube 5, which may be made of plastic material for example. The diameter of the tube is such that it is a force fit in the groove 4, so as to be held therein, It will be appreciated that either the tube or the support may be made of a somewhat resilient material, and that the tube may contact only the inner edge of the groove, only its outer edge, or both, so long as it is a tight fit in each case.

In order to prepare the scarificator according to the invention for use, after having sterilized the scarifying points and the tube 5, one end of the tube is plunged into a solution of a biological substance having the desired viscosity so that a certain quantity of this substance is retained in the tube by capillarity. The tube is then positioned in the groove surrounding the scarifying points as shown in FIG. 2. The active substance 6 is thus applied to the scarifying points, as also shown in FIG. 2.

To store the scarificator, it may be placed inside a sealed container, preferably a plastic bag.

At the moment at which it is to be used the scarificator is removed from the container and the tube 5 is lifted. Due to capillarity, the greater part of the biological substance remains on the scarifying points, which are perfectly impregnated therewith, as shown on FIGS. 1 and 3. The only remaining step is to proceed with the test or vaccination.

Tests carried out by applicants have shown that the very simple device herein described permits biological substances to be kept quite satisfactorily and that the scarifying points are so impregnated at the moment that the test or vaccination is performed that such operations are carried out with complete success.

It will of course be understood that this embodiment has been described purely by way of example and that the invention is not limited to the details thereof, but may be modified without thereby departing from the spirit of the invention.

In particular, the invention may be applied to scarificators of any type, regardless of the means by which they are to be gripped.

Similarly, the shape of the tube may be changed, for example, by closing the end thereof opposite the one which is rested over the scarifying points.

What we claim is:

1. Means for scarifying the human body comprising a support, a group of scarifying points projecting in the same general direction from said support, a groove in said support encircling said points, and a capillary tube having two open ends, one of which is a force fit into said groove so as to be releasably retained in said groove after insertion therein, in a position encircling said points.

2. Scarifying means as claimed in claim 1 in which said tube is at least twice as long as it is wide.

3. A unit for treating the body comprising scarifying means as claimed in claim 1, a viscous liquid suitable for introduction into the body positioned within said tube and impregnating said points; and a sealed plastic container enclosing said scarifying means.

References Cited by the Examiner

UNITED STATES PATENTS

| 741,886 | 10/1903 | Chandler. | |
| 2,893,392 | 7/1959 | Wagner et al. | 128—253 |
| 2,974,787 | 3/1961 | Cooper | 128—253 X |
| 3,062,212 | 11/1962 | Kravitz et al. | 128—253 |
| 3,072,122 | 1/1963 | Rosenthal | 128—253 |
| 3,136,314 | 6/1964 | Kravitz | 128—253 |
| 3,167,073 | 1/1965 | Rosenthal | 128—253 |

FOREIGN PATENTS

| 846,767 | 8/1952 | Germany. |

RICHARD A. GAUDET, *Primary Examiner.*

R. L. FRINKS, *Assistant Examiner.*